US009232211B2

(12) United States Patent
Javidi et al.

(10) Patent No.: US 9,232,211 B2
(45) Date of Patent: Jan. 5, 2016

(54) SYSTEM AND METHODS FOR THREE-DIMENSIONAL IMAGING OF OBJECTS IN A SCATTERING MEDIUM

(75) Inventors: Bahram Javidi, Storrs, CT (US); Inkyu Moon, Willington, CT (US); Robert T. Schulein, Waltham, MA (US); Myungjin Cho, Vernon, CT (US); Cuong Manh Do, Willington, CT (US)

(73) Assignee: THE UNIVERSITY OF CONNECTICUT, Farmington, CT (US)

( * ) Notice: Subject to any disclaimer, the term of this patent is extended or adjusted under 35 U.S.C. 154(b) by 867 days.

(21) Appl. No.: 12/847,341

(22) Filed: Jul. 30, 2010

(65) Prior Publication Data
US 2012/0194649 A1   Aug. 2, 2012

Related U.S. Application Data

(60) Provisional application No. 61/273,160, filed on Jul. 31, 2009.

(51) Int. Cl.
| H04N 13/02 | (2006.01) |
| H04N 15/00 | (2006.01) |
| G06K 9/00 | (2006.01) |
| G06K 9/36 | (2006.01) |
| H04N 13/04 | (2006.01) |
| G06K 9/62 | (2006.01) |
| G06T 5/50 | (2006.01) |

(52) U.S. Cl.
CPC .......... *H04N 13/0232* (2013.01); *G06K 9/6247* (2013.01); *G06T 5/50* (2013.01); *H04N 13/0406* (2013.01); *H04N 13/049* (2013.01); *G06T 2200/21* (2013.01)

(58) Field of Classification Search
USPC ........ 348/47, 50, 63, E13.014, 294; 382/103, 382/106, 156, 181, 254, 284; 706/20
See application file for complete search history.

(56) References Cited

U.S. PATENT DOCUMENTS

| 5,696,577 A | * | 12/1997 | Stettner et al. | ............... 356/4.01 |
| 6,496,813 B1 | * | 12/2002 | Labreche et al. | ............... 706/20 |
| 2009/0160985 A1 | * | 6/2009 | Javidi et al. | ................... 348/294 |
| 2009/0303055 A1 | * | 12/2009 | Anderson et al. | .......... 340/573.6 |

FOREIGN PATENT DOCUMENTS

WO   WO 2007025278 A2 *  3/2007

OTHER PUBLICATIONS

Moon, Inkyu and Bahram Javidi. "Three-dimensional visualization of objects in scattering medium by use of computational integral imaging." Optics Express 16.17 (Aug. 18, 2008): 13080-13089.*

(Continued)

*Primary Examiner* — Christopher S Kelley
*Assistant Examiner* — Ana Picon-Feliciano
(74) *Attorney, Agent, or Firm* — Cantor Colburn LLP

(57) ABSTRACT

A system for three-dimensional visualization of object in a scattering medium includes a sensor for receiving light from the object in the scattering medium and a computing device coupled to the sensor and receiving a plurality of elemental images of the object from the sensor. The computing device causes the elemental images to be magnified through a virtual pin-hole array to create an overlapping pattern of magnified elemental images. The computing device also averages overlapping portions of the element images to form an integrated image.

12 Claims, 9 Drawing Sheets

(56) References Cited

OTHER PUBLICATIONS

Schulein, Robert, and Bahram Javidi. "In-water 3D integral imaging." SPIE Defense, Security, and Sensing. International Society for Optics and Photonics, May 6, 2009.*

Do, Cuong Manh, and Bahram Javidi. "Three-Dimensional Object Recognition With Multiview Photon-Counting Sensing and Imaging." Photonics Journal, IEEE 1.1 (Jun. 1, 2009): 9-20.*

Aires, F., C. Prigent, and W. B. Rossow. "Neural network uncertainty assessment using Bayesian statistics with application to remote sensing: 3. Network Jacobians." Journal of geophysical research 109.D10 (May 21, 2004): D10305.*

Bishop, Christopher M. "Pattern recognition and machine learning". vol. 4. No. 4. New York: springer, Aug. 17, 2006.*

Farsiu et al. "Statistical detection and imaging of objects hidden in turbid media using ballistic photons" Applied Optics 46(43):5805-5822(2007) 18 pages.*

Schulein, R.; Javidi, B.; , "Underwater Multi-View Three-Dimensional Imaging," Display Technology, Journal of , vol. 4, No. 4, pp. 351-353, Dec. 2008 doi: 10.1109/JDT.2008.924161.*

Javidi, Bahram, Rodrigo Ponce-Díaz, and Seung-Hyun Hong. "Three-dimensional recognition of occluded objects by using computational integral imaging." Optics letters 31.8 ( Apr. 15, 2006): 1106-1108.*

Yeom, Sekwon, and Bahram Javidi. "Three-dimensional distortion-tolerant object recognition using integral imaging." Optics Express 12.23 (Nov. 15, 2004): 5795-5809.*

\* cited by examiner

SYSTEM AND METHODS FOR THREE-DIMENSIONAL IMAGING OF OBJECTS IN A SCATTERING MEDIUM

CROSS-REFERENCE TO RELATED APPLICATIONS

This application claims priority to Provisional Application No. 61/273,160 filed Jul. 31, 2009, and entitled "SYSTEM AND METHODS FOR THREE-DIMENSIONAL IMAGING OF OBJECTS IN A SCATTERING MEDIUM," the entire contents of which are hereby incorporated by reference.

STATEMENT OF FEDERALLY FUNDED RESEARCH

This invention was made with support from the United States Government under contract number 524636 awarded by the Defense Advanced Research Projects Agency (DARPA). The United States Government has certain rights in this invention.

BACKGROUND

The present invention relates generally to the field of systems and methods for three-dimensional (3D) imaging including, but not limited to, systems and methods for 3D image processing and for 3D visualization of objects and targets in a scattering medium.

Integral imaging and digital holography techniques have been studied for real-time sensing, visualization and recognition of real-world objects. Integral imaging is a passive three dimensional (3D) imaging technique that utilizes multi-perspective information to extract the depth information of a 3D object. In such a system, a lenslet array or an imaging device with a synthetic aperture captures a set of 2D elemental images from slightly different perspectives that together contain the 3D information of an object. The computational modeling of integral imaging for 3D visualization of the object can be performed by using a virtual ray propagation algorithm.

In digital holography, a digital hologram, i.e. the diffraction pattern of the object illuminated by coherent light, is recorded on an image sensor. The original 3D field of the object is computationally reconstructed from the digital hologram of the object by using a virtual Fresnel propagation algorithm.

These two 3D optical imaging systems have found a variety of applications including 3D image recognition, occluded 3D object visualization, automatic analysis of 3D microscopic image data, holographic tomography, and 3D display.

Current technologies used in the field to address visualization of objects in scattering media comprise the use of Laser Radar (LADAR). LADAR suffers from being expensive, complex, and limitations of photon counting sensors. Also, it cannot be used for persistent surveillance.

SUMMARY

According to one embodiment of the present invention, a system for three-dimensional visualization of an object in a scattering medium is disclosed. The system of this embodiment includes a sensor for receiving light from the object in the scattering medium and a computing device coupled to the sensor that receives a plurality of elemental images of the object from the sensor. The computing device of this embodiment causes the elemental images to be magnified through a virtual pin-hole array to create a pattern of overlapping magnified elemental images and also averages overlapping portions of the magnified element images to form an integrated image.

According to another embodiment of the present invention, a method of visualizing an object in a scattering medium is disclosed. The method of this embodiment includes: receiving from an imaging system a plurality of elemental images of the object from different locations; forming magnified elemental images from the elemental images; overlapping the magnified elemental images on a reconstruction image plane; and forming an integrated image of the object based on the overlapping magnified elemental images.

According to another embodiment of the present invention, a system for three-dimensional visualization of an object disposed between two scattering layers is disclosed. The system of this embodiment includes an illumination source that projects light through the two scattering layers and that contacts the object and a plurality of imaging devices disposed at predetermined locations relative to each other and recording information related to ballistic and non-ballistic photons resulting from the light that passes through the two scattering layers. The system of this embodiment also includes a computing device coupled to the plurality of imaging devices and configured to separate information related to ballistic photons from information related to non-ballistic photons.

According to yet another embodiment of the present invention, a method of three-dimensional visualization of an object disposed between two scattering layers is disclosed. The method of this embodiment includes: illuminating the object with an illumination source that projects light through the two scattering layers; imaging the objected with imaging devices disposed at predetermined locations relative to each other and that record information related to ballistic and non-ballistic photons resulting from the light that passes through the two scattering layers; and separating information related to ballistic photons from information related to non-ballistic photons.

According to yet another embodiment of the present invention, a method of imaging objects in water, is disclosed. The method of this embodiment includes: receiving from an imaging system a plurality of elemental images of the object from different locations; determining a distance of the object below a surface of the water; and reconstructing the object from the plurality of elemental images of the object at a distance z'water that is equal to the distance of the object below the surface of the water divided by the index of refraction of the water.

According to yet another embodiment of the present invention, a system for identifying underwater objects is disclosed. The system of this embodiment includes an integral imaging system configured to form elemental images of training objects and an object of interest and a principal component analysis (PCA) processor that converts the element images into PCA transformed vectors. The system of this embodiment also includes a neural network coupled to the PCA processor configured to compare a PCA transformed vector related to the object of interest to vectors related to the training objects to classify the object of interest.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention are directed to utilizing 3D imaging for imaging objects in a scattering medium. As the term is used herein, a "scattering medium" refers to any medium through which light may pass but that may cause some or all of the light to be diffracted, deflected, reflected or otherwise scattered. Examples of scattering media include: clouds, fog, smoke, water, and biological tissue.

In more detail, embodiments of the present invention are directed to systems and methods for the 3D visualization of an object in scattering media by use of synthetic aperture integral imaging (SAII) or synthetic aperture coherent integral imaging (SACII) algorithms and systems hardware. The systems and methods extract ballistic photons from scattered photons in an input image in one embodiment. Ballistic photons are generally understood to be those photons that travel through a scattering medium in a straight line. That is, ballistic photons are not scattered by the scattering medium. For example, in the case of laser pulses traveling through a scattering medium such as fog or a biological tissue, the few photons remaining un-scattered are ballistic photons.

Indeed, according to an exemplary embodiment, the present invention may overcome the limitations of the current LADAR-based technologies for imaging through a scattering medium in that they take into account the difference in perspective between individual elemental images. These multiple images are used for 3D reconstruction of the object.

Figure 1:
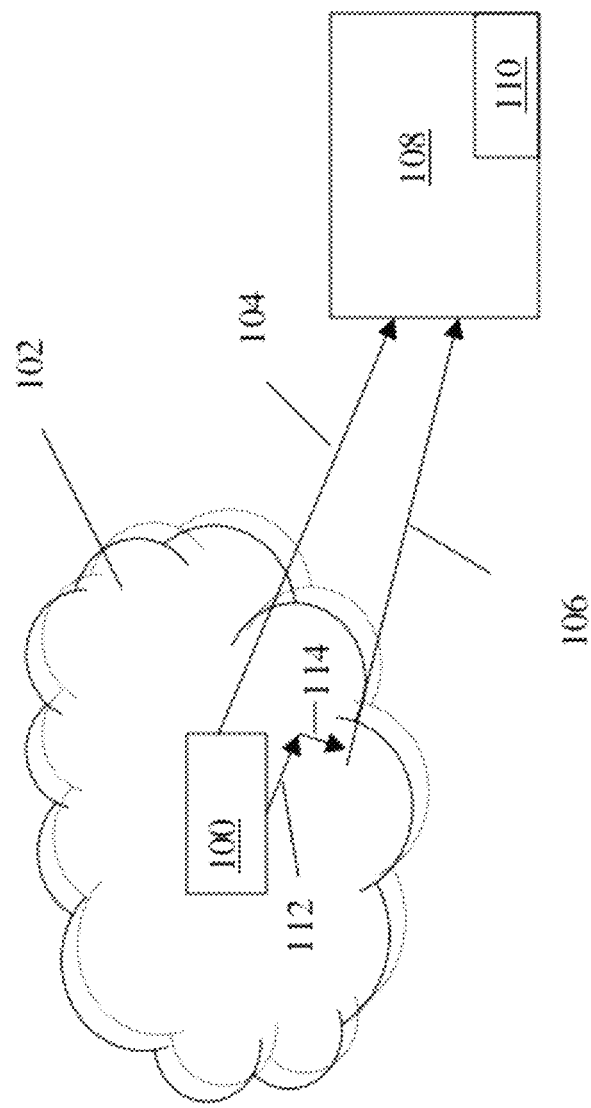
FIG. 1 shows an example of an object in a scattering medium being imaged by a system according to an embodiment of the present invention.

FIG. 1 shows an object 100 in scattering medium 102. One or more light rays 104, 106 emanate from the object and are received by an imaging system 108. In one embodiment, an imaging system 108 includes an illumination source 110 to irradiate the object 100. The illumination source 110 is a laser in one embodiment. The object 100 reflects the illumination back to the imaging source 108 in the form of light rays 104, 106. In one embodiment, the illumination source is omitted. In such an embodiment, the imaging system is a passive system in that it does not add additional illumination to the object.

The light rays 104, 106 are formed by photons. In this example, the first light ray 104 passes directly though the scattering medium 102. As such, the first light ray 104 provides ballistic photons to the imaging system 108. The second light ray 106 does not travel directly from the object 100 to the imaging system 108. Rather, the second light ray is scattered as indicated by scattered ray portions 112 and 114. According to one embodiment, the some or all of the photons that form second light ray 106 (and any other "non-direct" light ray) are removed from any reconstructed image. That is, in one embodiment, ballistic photons are separated from non-ballistic photons and images of the object 100 are reconstructed utilizing information received substantially only from the ballistic photons.

Figure 2:
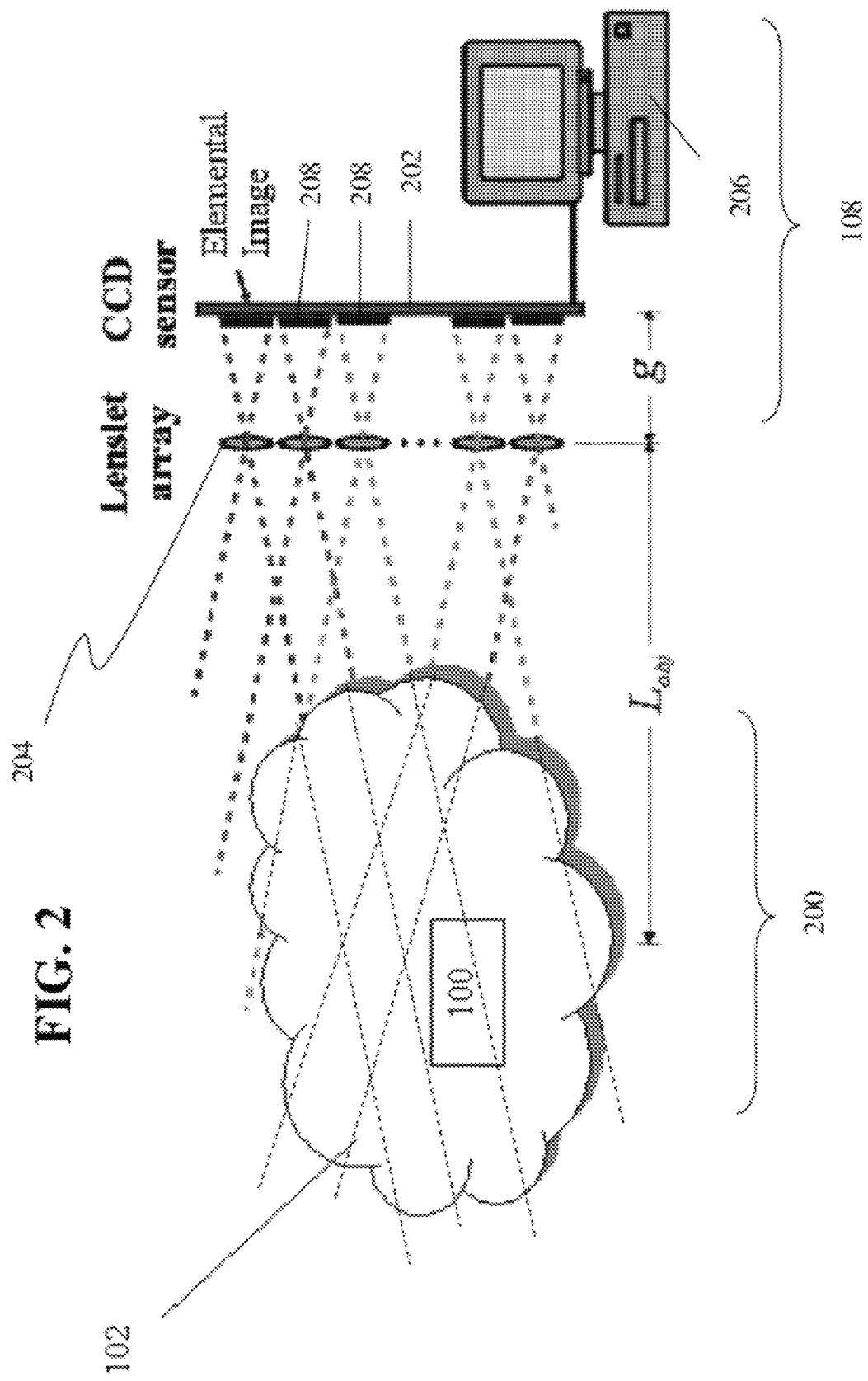
FIG. 2 shows an example of an imaging system that may be utilized to record a 3D scene including an object in a scattering medium according to an embodiment of the present invention.

FIG. 2 shows an example of an imaging system 108 that may be utilized to record a 3D scene 200 including an object 100 in a scattering medium 102. Each voxel of the 3D scene 200 can be mapped into an imaging plane 202 of a pickup lenslet array 204 and can form the elemental images in the pickup process of the integral imaging system 108 within its viewing angle range. Each recorded elemental image conveys a different perspective and different distance information of the 3D scene 200. In one embodiment, the imaging system 108 includes a computing device 206. The computing device 206 includes programming or devices that may record the elemental images.

In one embodiment, the scattered elemental images of a 3D object 100 are captured from different perspectives. This may be accomplished by moving the imaging plane 202 to different locations. Alternatively, each individual sensor 208 of the imaging plane 202 captures light rays emanating from the object 100. Each sensor 208 forms a different channel in one embodiment. Therefore, each channel generates a 2D elemental image containing directional information of the object 100. The captured elemental images have different perspectives of the object 100 according to the location of multiple image channels.

For computational reconstruction of a 3D object in SAII, the reverse of the pick-up process described above is computationally simulated by using geometrical ray optics. In this method, a 2D sectional image of the 3D object located at a particular distance from the sensor is reconstructed by back propagating the elemental images through the virtual pin-hole arrays as shown in FIG. 3.

Figure 3:
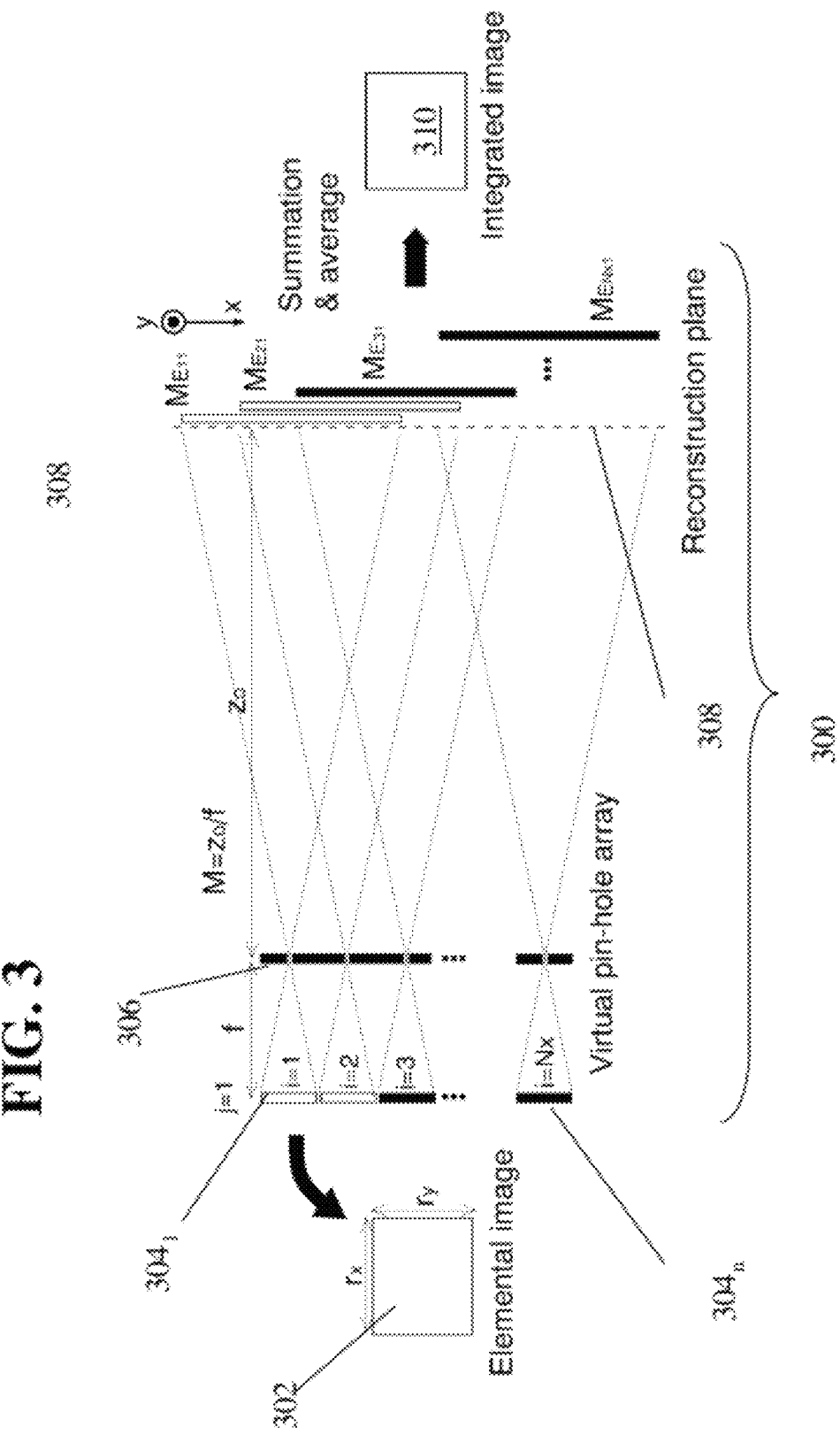
FIG. 3 illustrates a conceptual view of a reconstruction system according to one embodiment.

FIG. 3 illustrates a conceptual view of a SAII reconstruction system 300. The system 300 may be implemented on a computing device in one embodiment. The system utilizes a ray back propagation algorithm that magnifies each elemental image at the desired reconstruction distance. In terms of FIG. 3, the elemental image is shown as object 302. Conceptually, the object is formed by a plurality of elements 304. Each element $304_1$ to $304_n$ that forms the object 302 is projected through a virtual pin-hole array 306 onto a reconstruction plane 308. Such projection causes each element 304 to be magnified. In one embodiment, each element 304 is magnified by a factor M where M equals the distance from the pin-hole array 306 to the reconstruction plane ($z_0$) divided by distance from the elements 304 to the pin-hole array 306 (f).

That is, $M=z_0/f$ in one embodiment.

The magnified elemental images $M_{Eij}$ each correspond to a different one of the elements 304. In one embodiment, the magnified elemental images $M_{Eij}$ overlap on the reconstruction image plane 308.

Figure 4:
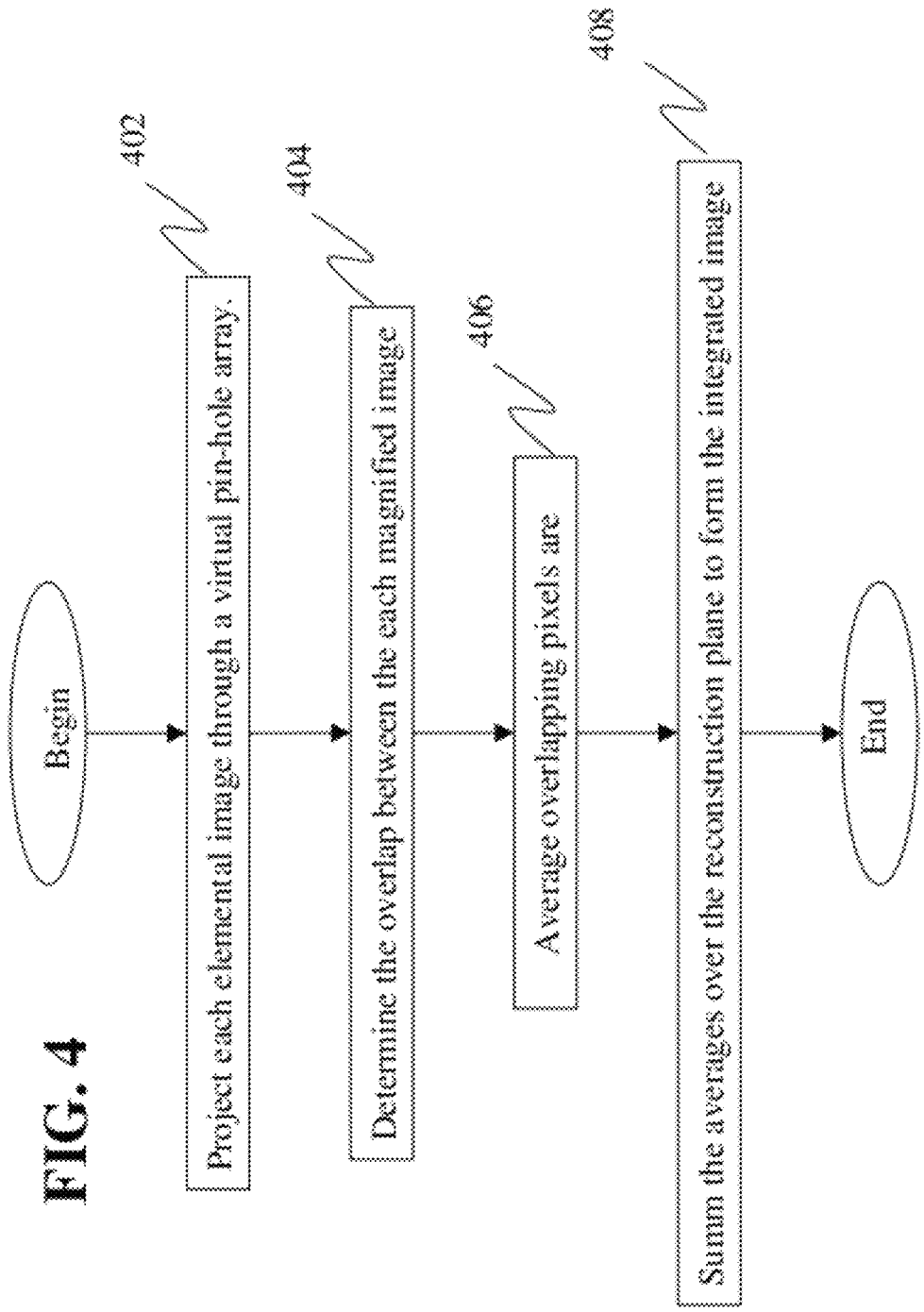
FIG. 4 is a flow chart showing a method according to one embodiment.

According to one embodiment, the reconstruction algorithm consists of two parts: shifting of each magnified elemental image $M_{Eij}$ and averaging of the overlapped pixels in the integral image over the reconstruction plane. In more detail, and as shown in FIG. 4, at a block 402 each elemental image is projected through a virtual pin-hole array. This results in a plurality of magnified images being formed where the magnification $M=z_0/f$ as described above. At a block 404 the overlap between the each magnified image is determined. For example, in FIG. 3 portions of both $M_{E21}$ and $M_{E31}$ include pixels that overlap $M_{E11}$. At a block 406 the overlapping pixels are averaged. At a block 408, the averages over the reconstruction plane are summed to form the integrated image in the particular reconstruction. Of course, the method shown in FIG. 4 could be repeated for each reconstruction plane required to capture then entire elemental image 302 (FIG. 3).

In more detail, the 3D image reconstruction of the SAII can be described as follows:

$$I(x, y, z_0) = \frac{1}{N_s} \sum_{i=0}^{N_i-1} \sum_{j=0}^{N_j-1} M_{Eij}\left(x + \frac{z_0 p_x}{f} i, y + \frac{z_0 p_y}{f} j\right), \quad (1)$$

where i and j are the index of the each elemental image, $N_x$ and $N_y$ are the number of elemental images 304 in x and y directions, $M_{Eij}(\cdot)$ is a magnified elemental image, $p_x$ and $p_y$ are the shifted value of the sensor channels in x and y directions, and $N_s$ is the number of the overlapped pixels for the magnified elemental images as shown in FIG. 3. The total image size projected by each magnified elemental image $M_{Eij}$ at a reconstruction plane 308 is given by:

$$\left[p_x \cdot \left(\frac{z_0}{f} + N_x - 1\right)\right] \times \left[p_y \cdot \left(\frac{z_0}{f} + N_y - 1\right)\right]. \quad (2)$$

In the computational SAII, a 3D image reconstruction can be obtained because the overlapping factor in the elemental images is changed according to the reconstruction distance.

In short, using integral imaging techniques, the scattered elemental images 304 of a 3D object 302 are captured from different perspectives. The sectional images of the object 302 are numerically reconstructed from the scattered elemental image set by back propagation of rays to an arbitrary plane with a virtual wave of a given wavelength. The concept of the present invention allows the 3D imaging and visualization in scattering medium by averaging out the distortion patterns induced by the cross-interference of the scattering and object beam.

Figure 5:
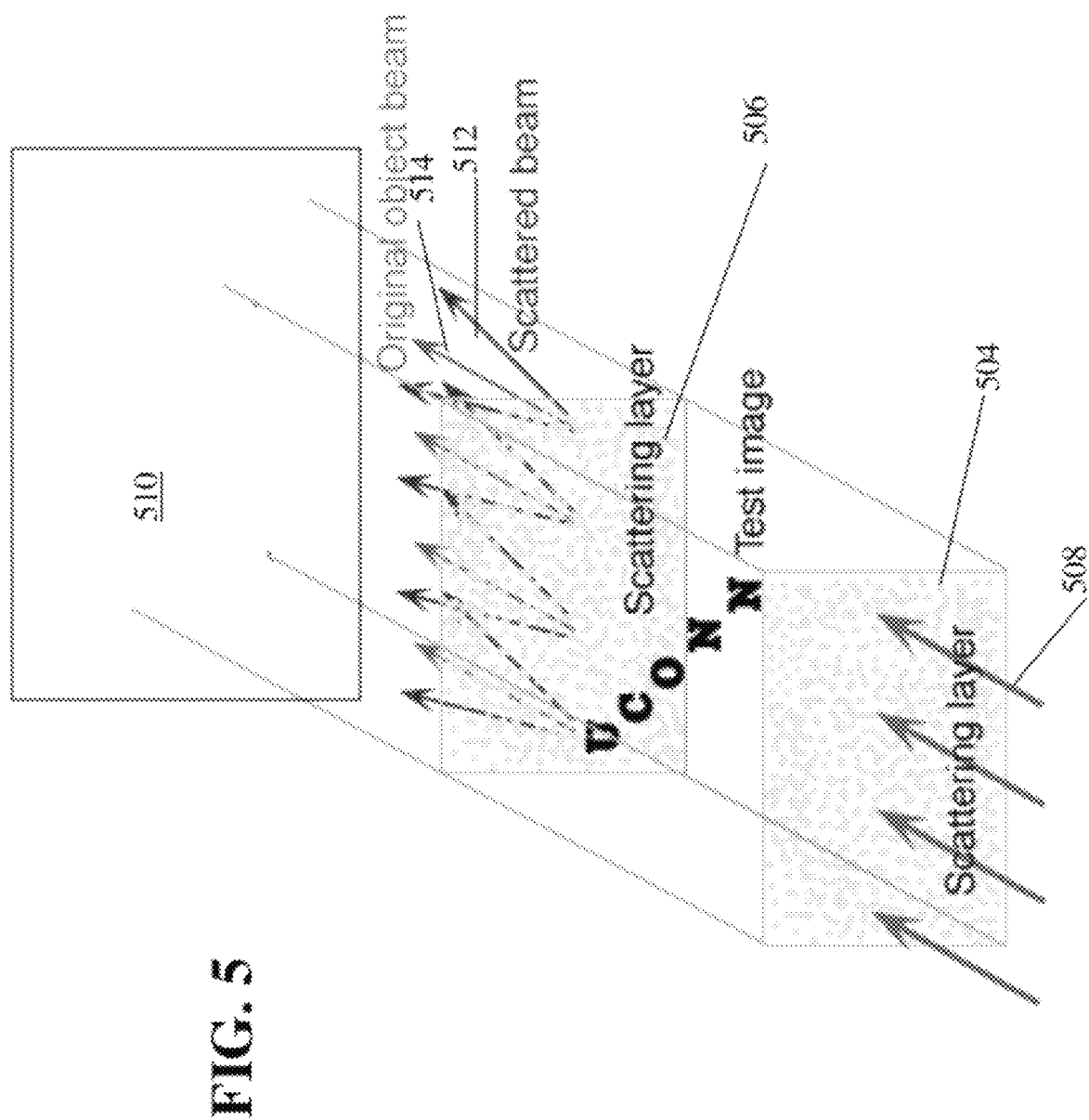
FIG. 5 shows an example of another embodiment of an imaging system.

According to another embodiment, a synthetic aperture coherent integral imaging (SACII) system is designed to sense and reconstruct the object displaced between scattering layers. An example of a SACII system 500 is shown in FIG. 5. In operation, the system 500 may includes an object 502 embedded between two scattering layers 504, 506. A coherent beam 508 illuminates the object 502 in order to three-dimensionally visualize objects in a scattering medium. The scattered elemental image set which contains different depth information with different perspectives of a 3D object is recorded by a recording device 510 under the coherent illumination.

Figure 6:
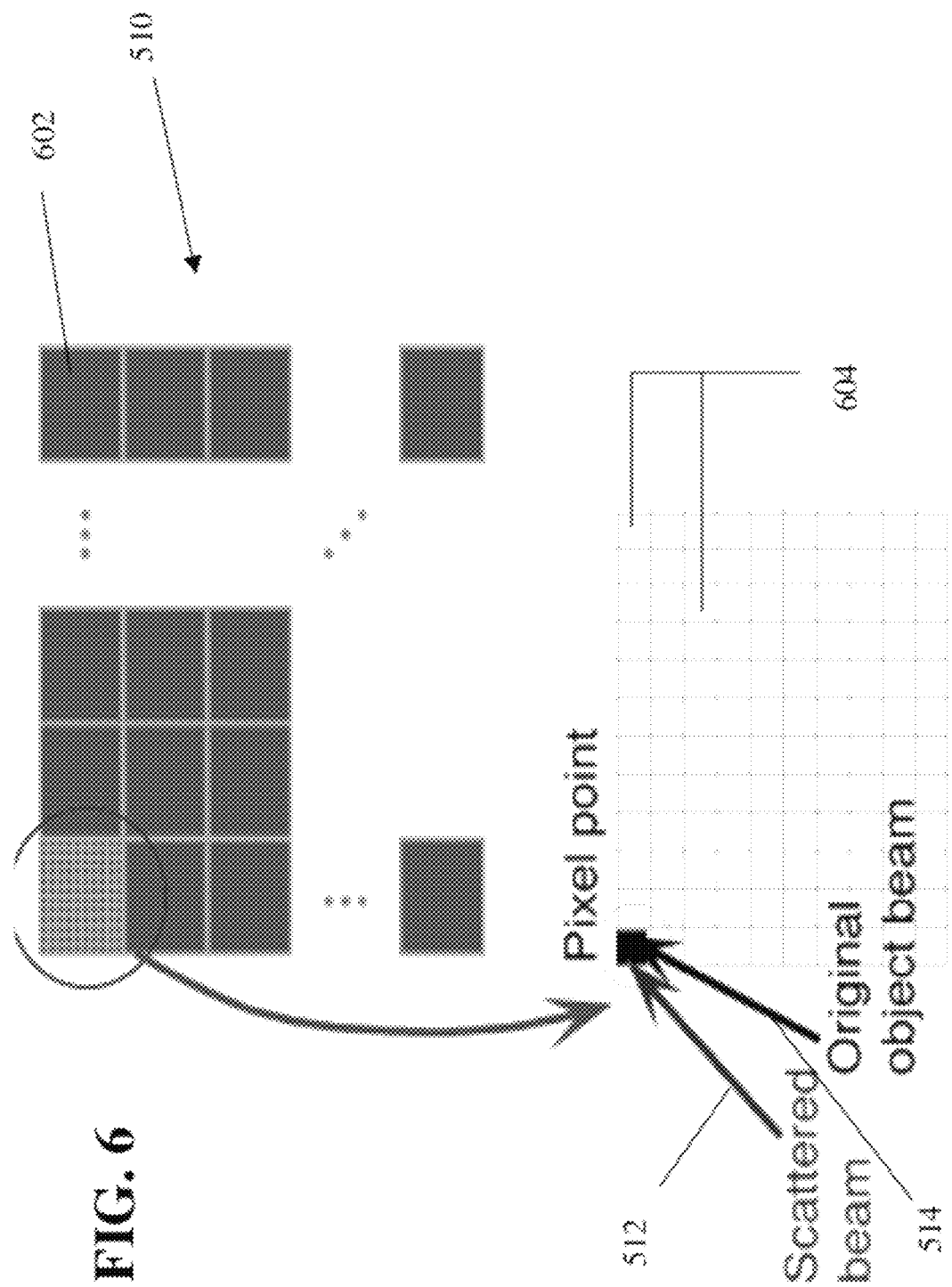
FIG. 6 is a more detailed depiction of a recording device that may be utilized in the system shown in FIG. 5.

FIG. 6 shows an example of a recording device 510 according to one embodiment. In this embodiment, the recording device 510 is formed by a plurality of imaging devices 602. Each imaging device 602 is formed by a camera in one embodiment. One or more of the imaging devices 602 includes several pixels 604 and are located at different locations. In one embodiment, the locations of the imaging devices 602 relative to one another are known. It shall be understood that the imaging device FIG. 2 and the recording device 510 of FIG. 6 may be interchanged with one another to form in any system disclosed herein.

Referring now to FIGS. 5 and 6, each elemental image projects a shifted interference patterns due to the interference between scattered object beams 512 and original object beams 514. In the plane of the imaging device 602, the scattered beam 512 interferes at each pixel 604 with object beams 514. Therefore, the irradiance image recorded by the each imaging device 602 has the following form as a function of the phase modulation:

$$I(\vec{r}_p)_n \approx (|S|^2 + |E|^2 + 2|S||E|\cos[(\vec{k}_S - \vec{k}_E) \Box \vec{r}_p])_n, \quad (3)$$

where $|S|^2$ and $|E|^2$ are the scattered and object beam intensities, n is the elemental image number, and $\vec{r}_p$ is a position vector in the elemental image, and $\vec{k}$ is the wave-number. In general, the fluctuation of $|S|^2$ is slow compared with $|E|^2$ due to scattering. The second term in Eq. (3) contains the perspective information of a 3D object. It shall be assumed herein the object 502 between scattering layers 504 and 506 is distorted. The object 502 is recovered from the distorted perspective images of the 3D object by using multiple imaging channels (i.e., multiple imaging devices 602) based on integral imaging. The $2|S||E|\cos[(\vec{k}_S - \vec{k}_E)|\Box \vec{r}_p]$ term in Eq. (3) denotes interference patterns between original beams 514 and scattered beams 512. This term may be the primary cause for the distortion of the original object in the SACII system 500. The set of the corresponding pixels 604 in different imaging devices 602 can be modeled as samples of a random intensity distribution due to the random variation of cosine term in Eq. (3). In other words, each pixel gets the scattering contribution from a scattered wave with a random k vector, and thus, by adding up the pixel values, the effect of the scatter wave will diminish whereas the effect of the ballistic wave will constructively add up. Therefore, it can be assumed that the object distortion is a result of the interferences due to many scattered waves with different phases.

In one embodiment, the SACII system 500 captures N measurements through multiple imaging channels so that the image of the scattered object at the $p_{th}$ pixel position, corresponding to one point in the object space, can be described as follows:

$$I_p^s(i) = I_p^o + w_p(i) \text{ for } i=1, \ldots, N, \quad (4)$$

where $I_p^s(i)$ and $I_p^o(i)$ are scattered and original object beam intensities, respectively and $w_p(i)$ is random variable following independent and identically distributed (IID) statistical model. Due to the fact that the $w_p(i)$ is IID, the recorded samples, $I_p^s(i)$, are also statistically independent. In order to recover the original intensity of one point of the object, the statistical independence of $I_p^s(i)$ may be used by adding up the corresponding N samples of a single object point captured by N different imaging channels such that the expectation of the cosine term in Eq. (3) diminishes to zero given the fact that the argument of cosine follows uniform distribution from $-\pi$ to π. Therefore, three-dimensional visualization of the object in the scattering medium can be obtained by shifting and summing the scattered elemental images using the computational ray back propagation algorithm. The original 3D information can then be presented over a number of reconstruction depths as is known in the art. Finally, the integrated image can be written as:

$$I = \sum_{n=1}^{N} I(\vec{r}_p)_n \approx N(|S|^2 + |E|^2), \quad (5)$$

where N is total number of elemental images. According to Eq. (5), it is believed that a sufficient number of elemental images allow the optical imaging through scattering medium even if the unscattered beam information is weak owing to the fact that the distortion term in Eq. (3) is averaged out to zero resulting in the original unscattered beam. That is, as the distortion term is averaged to zero, the ballistic and non-ballistic photons are separated.

In one embodiment of the present invention, the methods and systems disclosed herein are applied to biomedical imaging such as the visualization of objects or biological features of interest that are obscured by or "hidden" behind tissues. In other embodiments, the present invention can be applied to visualization of objects or targets of interest for security and defense-related purposes.

In one embodiment, the teachings herein may be utilized for passive three-dimensional imaging to be used in underwater environments. As used herein, passive imaging comprises imaging performed using only the lighting, such as sunlight, that is present without adding any source of artificial light as part of the imaging system. In one embodiment, underwater imaging may include an integral imaging model. The current three-dimensional imaging technologies for underwater use comprise sonar, LADAR, and stereoscopic imaging. These technologies are used to collect ranging information of other objects (i.e. submarines, boats, large marine life) in the water, typically at long distances. For close-up optical inspection or imaging of objects in water, single cameras are currently used. In the present invention as applied to underwater imaging, commercial off-the-shelf components are utilized, and the invention is relatively inexpensive to implement compared to the currently used long distance technologies.

In one embodiment, when the teachings of present invention are utilized for underwater imaging, the multi-camera approach described with respect to FIGS. 5 and 6 above may be implemented. This allows for more accurate ranging information than stereo imaging and gives the system the ability to "see through" occluding objects that may be blocking a single viewpoint. The additional costs to add more views are relatively low.

The above teachings have been directed, generally, to 3D visualization of objects in air. Of course, the above teachings may be completely or partially applicable to objects located underwater. Indeed, 3D visualization of underwater objects has various applications and benefits for marine sciences, inspection of vessels, security and defense, underwater exploration, unmanned underwater vehicles, etc. In some aspects, underwater imaging is inherently different from imaging in air due to absorption and scattering of light from various underwater particles and molecules.

One or more embodiments of the present invention may be directed to systems and methods that deal specifically with visualizing objects placed in water by utilizing a computational integral imaging reconstruction method of. In one embodiment, the water is turbid water.

As discussed in greater detail above, integral imaging is used to reconstruct 3D images through measurements of both intensity and directions of optical rays. Multiple 2D images of the 3D scene with different perspectives referred to as "elemental images" are recorded and utilized to display or visualize the 3D scene and measure range. In turbid water, objects are distorted due to light scattering since the objects rays pass through a medium that is composed of randomly-distributed particles in water. Moreover, the reconstructed 3D integral images are degraded because of the effects of superimposed pixels for each distorted elemental image. While the following description includes utilizing an imaging device such as a camera placed outside of water and objects placed in turbid water it shall be understood that the imaging device could be located underwater.

Figure 7:
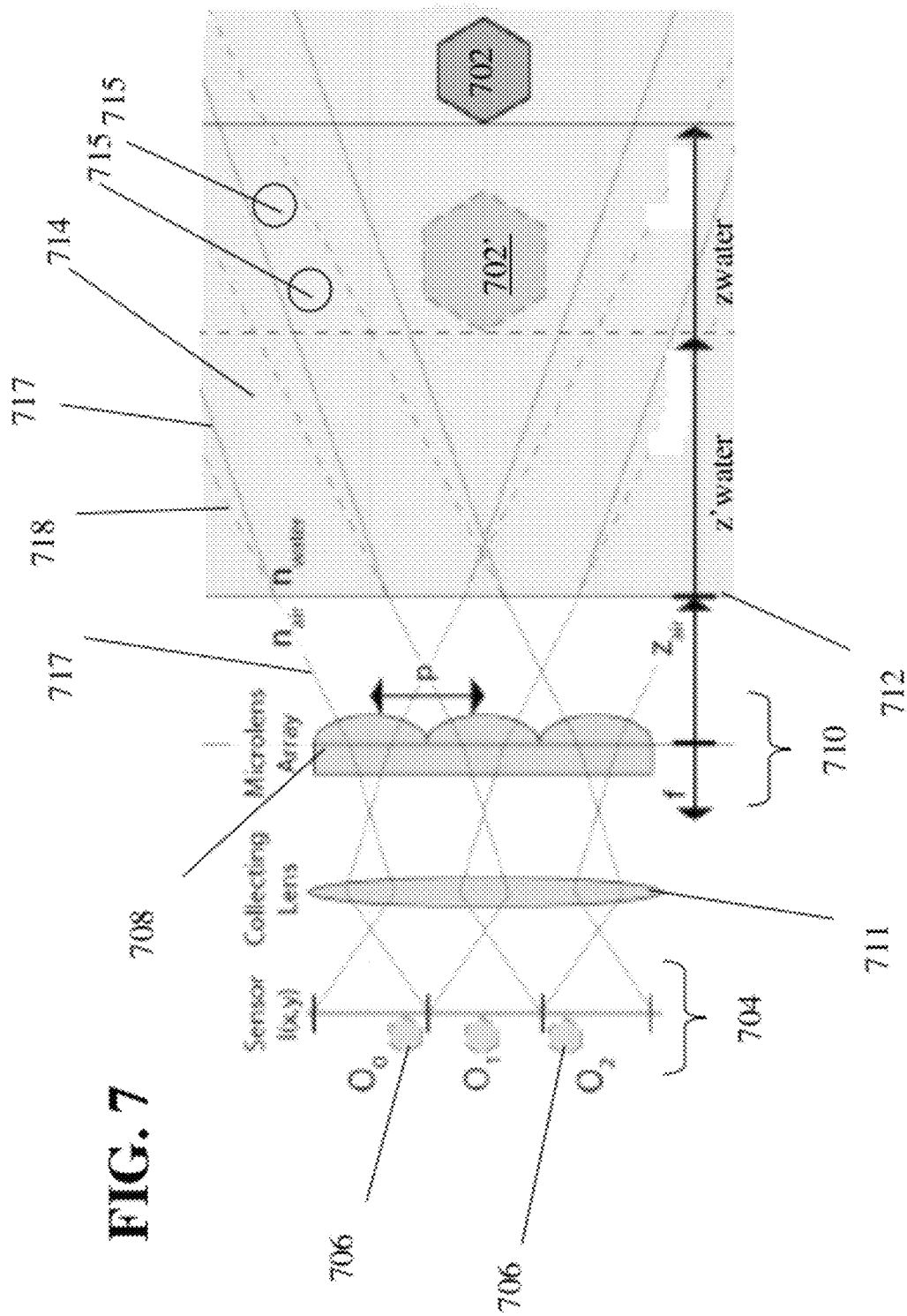
FIG. 7 shows an example configuration of a system for recording elemental images of an object in an underwater environment.

Referring now to FIG. 7 a system 700 for imaging an underwater object 702 according to one embodiment is disclosed. As above, the system 700 includes an imaging device 704. The imaging device 704 may be formed of one or more image sensors 706. Each image sensor 706 receives optical input directly or indirectly from one or more lenses 708 that form a microlens array 710. As illustrated, a collecting lens 711 an optional collecting lens 711 is disposed between the microlens array 710 and the imaging device 706. In this example, the object 702 is located underwater below the surface 712 of water 714. In one embodiment, the water 714 includes one or more occluding objects 715 within it. The water 714 may be clear or turbid water.

It shall be understood, that the imaging device 704 could be a single device that utilizes the microlens array 710 or it could be an array of imagers as shown, for example, in FIG. 5. In the latter example, the microlens array 710 may be omitted.

Rays in a scattering medium such as water behave according to the Beer-Lambert-Bouguer law which describes the transmitted intensity of light received from the object at the imaging device 704 as I(z)=Ioexp(−kz), where Io is the original intensity before scattering and z is the depth of the homogeneous medium. Here, the object 702 is placed at a distance $z_{water}$ from the surface 712 of the water 714. In the above equation, k is the total attenuation coefficient which depends on the illumination wavelength and the medium. For inhomogeneous media such as water, k is a function of spatial coordinates. This parameter is mainly responsible for attenuation, absorption, and scattering as light propagates in water and especially in turbid water.

At the interface between air and water 714 (e.g., at the surface 712) rays 717 are refracted according to Snell's law. In FIG. 7 rays 717 are refracted at the surface 714 such that ray 717 appears to be part of dashed line 718 but it is in fact part of refracted ray 718. Due to this law, the object 702 appears to be a distance z'water rather than the actual distance zwater. In this manner, the object appears to be "floated" above its actual location. Accordingly, the distance zwater is be changed in one embodiment to z'water=zwater/nwater where zwater is the actual distance between water surface 712 and object 702, nwater is the refraction index of water, and z'water is reconstruction distance between water surface 712 and object 702. Therefore, the reconstruction distance is shorter than the actual distance between image sensors and objects.

As described above, there are several different manners in which images thus recorded can be reconstructed. For example, one method of computational reconstruction of integral images involves back propagating the elemental images through virtual optics with similar properties as the pickup optics as describe above. One method of doing this is a plane-by-plane reconstruction method, where the elemental images ($O_i$) are projected and superimposed at a range of virtual planes. In this method, an object will appear in focus at the computational reconstruction plane corresponding to the distance the object was from the imaging device 704. By reconstructing a range of planes, full volumetric information of a scene can be ascertained. As described above, in one embodiment of the present invention, computational reconstruction may involve digitally magnifying the elemental images by a magnitude corresponding to the reconstruction plane. According to another embodiment, the reconstruction can involve shifting and superimposing the elemental images.

In general, to reconstruct 3D underwater images, the following equations are used:

$$S_x = \frac{N_x pf}{c_x(z_{air} + z'_{water})}, \quad S_y = \frac{N_x pf}{c_y(z_{air} + z'_{water})} \quad (6)$$

$$I(x, y, z_r) = \frac{1}{O(x, y)} \sum_{K=0}^{K-1} \sum_{K=0}^{L-1} I_{kl}(x = S_x k, y = S_y l) \quad (7)$$

where $N_x$, $N_y$ are the number of pixels for each elemental image in x and y direction, p is the moving gap between sensors 706, f is the focal length of the image sensor 706, $c_x$, $c_y$ are the size of the image sensor 706 in x and y direction, $S_x$, $S_y$ are the number of shifted pixels for reconstruction in x and y direction, k, l are the index of elemental images in x and y direction, $I_{kl}$ is the k column and lth row elemental image, O(x,y) is the superposition matrix of computational reconstruction, $z_r = z_{air} + z'_{water}$ is the actual reconstructed object distance, and $I(x,y,z_r)$ is the reconstructed 3D image, respectively.

Using Eqs. (6) and (7), a reconstructed 3D image can be obtained for object 702 in the case where the water 714 is clear. Experimental evidence has shown, however, when this reconstruction method is applied to objects in turbid water, the reconstructed 3D image cannot be clearly obtained due to light scattering which is caused by randomly-distributed particles in turbid water. To restore the original image, in one embodiment, statistical image processing techniques to the elemental images to reduce the effects of scattering, and then the reconstruction methods described above may be applied.

In one embodiment, the statistical image processing assumes that statistical image degradation due to turbid water is caused by light scattering, which can be modeled by Gaussian theory. The degradation function is composed of many superimposed Gaussian random variables with local area ($w_x \times w_y$) of an elemental image. These random variables are denoted as $X_{ij}(m,n) = I(i+m, j+n)$ where i=1, 2, ..., $N_x - w_x + 1$, j=1, 2, ..., $N_y - w_y + 1$, m=1, 2, ..., $w_x$, and n=1, 2, ..., $w_y$. The value of the mean of the unknown parameter μ of Gaussian distribution is estimated using Maximum Likelihood Estimation (MLE) by:

$$L(X_{ij}(m,n) \mid \mu_{ij}, \sigma_{ij}^2) = \prod_{m=1}^{w_x} \prod_{n=1}^{w_y} \frac{1}{\sqrt{2\pi\sigma^2}} e^{-(x_{ij}(m,n)-\mu)^2/2\sigma^2}$$

$$= \frac{1}{\sqrt{2\pi\sigma^2}} e^{-\sum_{m=1}^{w_x} \sum_{n=1}^{w_y} (x_{ij}(m,n)-\mu)^2/2\sigma^2}$$

$$\hat{\mu}_{ij} = \arg\max_{\mu}[l\{X_{ij}(m,n) \mid \mu_{ij}, \sigma_{ij}^2\}]$$

$$= \frac{1}{w_x w_y} \sum_{m=1}^{w_x} \sum_{n=1}^{w_y} x_{ij}(m,n)$$

where L(|) is the likelihood function, l(|) is the log likelihood function, and $\hat{\mu}$ is the estimated mean parameter of Gaussian distribution, respectively. The elemental images are processed by subtracting the mean estimated degradation factor $\hat{\mu}$:

$$S_{ij}(m,n) = X_{ij}(m,n) - \hat{\mu} \quad (8)$$

The new elemental image is referred to as the mean adjusted elemental image. Its histogram is skewed due to dark (low light level) pixels. Therefore, in one embodiment, the histogram is manipulated to enhance the contrast ratio in order to restore the original image. The histogram of the mean adjusted image can be manipulated by using Gamma (γ) correction in one embodiment. In particular, the gamma correction involves solving:

$$\gamma = \log\left(\frac{h_m - c}{d - c}\right) / \log\left(\frac{s_m - a}{b - a}\right) \quad (9)$$

for $h_m = 0.5$, c=0 and d=1, where $s_m$, $h_m$ are the median values of mean adjusted elemental image and the histogram stretched elemental image, respectively. Also, a, b, c, d are the minimum and maximum values in grayscale range of mean adjusted elemental image and histogram stretched elemental image, respectively.

Histogram equalization and matching are applied to remove artificial gray levels from the elemental images. A Cumulative Distribution Function (CDF) can be calculated as:

$$h_e = T(h) = \int_0^h p_h(w)dw \quad (10)$$

$$G(q) = \int_0^q p_q(t)dt = h_e \quad (11)$$

where h, $h_e$, and q are continuous gray levels of the histogram stretched image, the histogram equalized image, and histogram matched (processed) image, $p_h(h)$, $p_q(q)$ are their corresponding continuous probability density function, and w, t are the integration variables, respectively. Equations (10) and (11) are followed by G(q)=T(h) where the inverse of G operation yields the restored image in one embodiment.

One application of the imaging techniques described above is object identification. Principal component analysis (PCA) is a tool often used as an intermediate step in recognition applications. Multilayer neural networks are another technique that has been widely used in the area of pattern recognition, including 3D holographic recognition.

Figure 8:
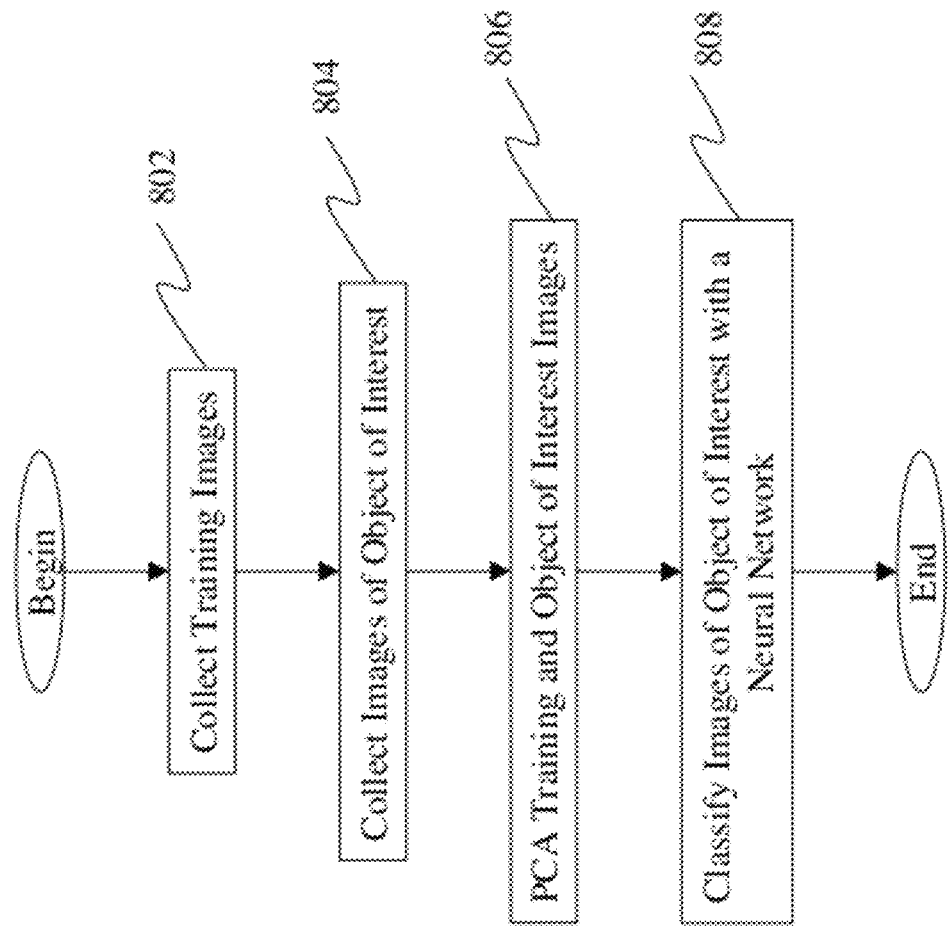
FIG. 8 is a flow chart showing a method of classifying objects in an underwater environment.

According to one embodiment, a distortion-tolerant object recognition method using passive 3D integral imaging for underwater sensing and multilayer neural networks for target recognition is disclosed. The method is shown, for example, by the flow chart in FIG. 8.

At a block 802 training images are collected. The training images are collected with objects positioned in air in one embodiment. The training images are collected utilizing a system as shown, for example, in FIG. 2. In one embodiment, the training images will be used for comparison to and classification of objects.

At a block 804 images of an object of interest are collected. The objects of interest may be collected by, for example, the system shown in FIG. 7 to which reference is now made. The objects of interest are underwater in one embodiment.

One way of improving the image quality in the optical pickup process is by using a pulsed source for illumination and gating the sensors 706 to reduce back-scattering from the occluding objects 715. When optical means of improving imaging quality are not an option, digital imaging processing means can be employed to improve the image quality and increase the recognition performance. Occlusion has the effect of adding additional noise to the imaging scenario and sometimes making it more difficult or impossible to identify an object. When significant amounts of scattering and absorptive particles are in water, the water visibility is low and the image contrast is significantly compromised. One method for extracting detailed high frequency information out of low contrast images is the gradient map. The gradient of each reconstruction plane image $I_R(x, y; z_R)$, is taken and defined as:

$$\text{gradient } IR = (x, y; zR) = \begin{bmatrix} \frac{\partial I_R(x, y, z_R)}{\partial x} \\ \frac{\partial I_R(x, y, z_R)}{\partial y} \end{bmatrix} \quad (12)$$

At block 806, PCA is used to reduce the data dimensions of the training and object image sets. In more detail, PCA is a statistical method for whitening data and reducing data dimensionality. PCA involves computing and applying a transform that projects possibly correlated data into a smaller amount of uncorrelated variables called principle components. The first principal component represents the largest possible data variability, with each successive principal component representing progressively smaller data variability. The PCA transform is based on eigenvalue decomposition of a data covariance matrix. PCA is an often-used eigenvector-based multivariate analysis tool because of its power and elegance.

The reduced images are then input into a neural network at a block 808 for classification. In one embodiment, the object of interest is classified as being one of the training images. In more detail, neural networks are adaptive nonlinear statistical data modeling tools that can be used for purposes of pattern recognition. Neural network systems consist of layers of nodes that accept input data and perform simple processes and pass output data to the next layers. Taken individually, each node is quite simple but the complete system can be quite complex. Nodes have the capability to pass information back to earlier nodes and thus the system can learn from new input information. For purposes of pattern recognition, training data trains the neural network system for ways to distinguish signals into different classifications. Object of interest images are input and propagated through the neural networks and an estimated classification decision is made. Neural networks are an excellent method for pattern recognition using low contrast images such as those obtained via underwater imaging. There are several different comparison methods that can be used in neural networks of the present invention to achieve recognition. One example includes the Polak-Ribiere conjugate gradient algorithm.

Figure 9:
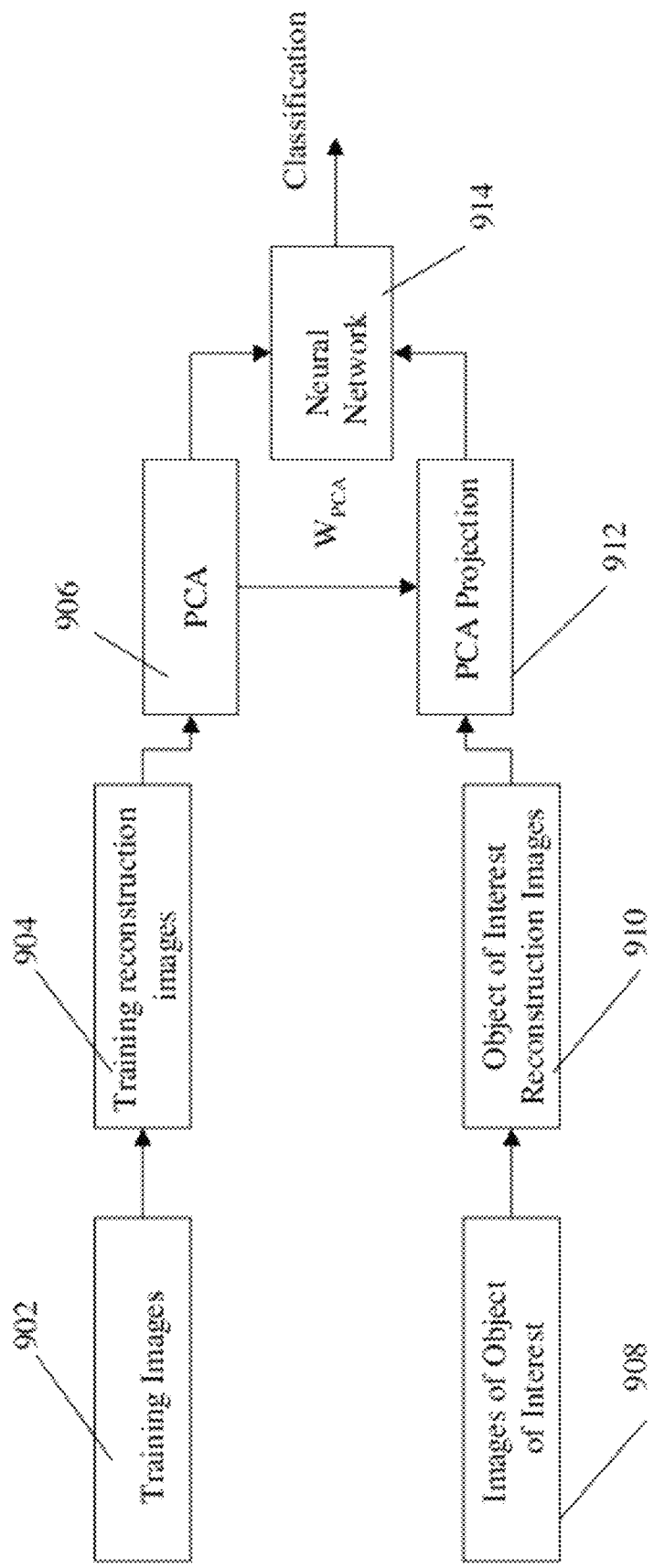
FIG. 9 shows a dataflow diagram according to one method of classifying objects in an underwater environment utilizing a neural network.

FIG. 9 shows a dataflow diagram showing the classification of an object of interest according to one embodiment. It shall be understood, the operations described with respect to FIG. 9 may be implemented on a computing device. Training images 902 are created in any of the manners described above. From the training images 902 one or more reconstruction images of the objects in the training images are formed and are shown as training reconstruction images 904. Again, these training reconstruction images may be formed by any manner described above or know in the art. In one embodiment, the training reconstruction images 904 are formed from training images 902 formed in air. The training reconstruction images 904 are provided to a PCA processor to form PCA transformed vector 906.

Similarly, images of the object of interest 908 are reconstructed to form object of interest reconstructed images 910. The object of interest reconstructed images 910 are provided to the PCA processor to form a PCA projection 912. The processing in the PCA processor is not described in greater detail.

The PCA processor may require formatting. Each output image in images 904 and 910 $I_{out}(x,y;z_R)$ is formatted into a column vector and appended to the matrix of previously formatted output images in one embodiment. In this way, each image of X×Y dimensions is converted to a column of D×1 dimensions, where D=X×Y. This process is repeated over a range of reconstruction planes, a range of object rotations, and a range of object classes.

Before the transformed training and testing data are input into the neural network 914 for classification, PCA is applied to the data. In more detail, the PCA processor may receive and D×N dimensional data set x, with $x_i$ being the ith column of data. In addition, the data set may comprise a unit vector $u_1$, where $u_1^T u_1 = 1$. Each data vector is projected with the unit vector to a scalar value $u_1^T x_i$. The variance of this projected data can be maximized by introducing a Lagrange multiplier $\lambda_1$ as a constraint such that $u_1^T S u_1 = \lambda_1$ where S is the covariance matrix of $x_i$. By way of this data projection, $u_1$ is an eigenvector of S. In general, the covariance matrix S can be decomposed as $S = U\lambda U^T$ where $U = [u_1, \ldots, u_D] \in R^{D \times D}$ contains N eigenvectors in it columns and $\lambda \in R^{D \times D}$ contains D eigenvalues on its diagonal. In one embodiment, the number of eigenvalues is equal to the length of the input column vector; so the same notation, D, is used for both. By projecting the data to an eigenvector with the largest eigenvalues, the projected variance is maximized and a desired number of principal components can be selected for data reduction. In one embodiment, the number of principal component dimensions M D of U is selected to lower the data dimensionality and form the PCA projection matrix $W_{PCA} \in R^{D \times M}$. To then reduce the dimensionality of the training reconstruction images 904 and object of interest images 910, each is first projected into the PCA space by $x_{PCA} = W_{PCA}^T x$ where $x \in R^{D \times 1}$ is the input values and $x \in R^{M \times 1}$ is the corresponding projected vector in the PCA space. The PCA projection matrix $W_{PCA}$ is calculated only for the training data set and then applied to both training and object of interest data for dimensionality reduction. This is done so that all training and object if interest data will be projected into the same PCA space and the same variances can be used across all training and object of interest data. The reduced PCA-transformed object of interest projection 912 and the training vectors 906 are then input into a neural network system 914 to classify the images of the object of interest. In one embodiment, the neural network system 914 is a three-layer neural network system.

The above description of the invention discusses the methods and systems in the context of visible light imaging. However, it will also be understood that the above methods and systems can also be used in multi-spectral applications, including, but not limited to, infrared applications as well as other suitable combinations of visible and non-visible light. It is also understood that the invention comprises cameras or other sensors or detectors suitable for the type of light in use in any given application or scenario.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention. In addition, it shall be understood that the methods disclosed herein may be implemented partially or completely by a computing device.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for three-dimensional visualization of an object in a scattering medium comprising:
   a coherent source illuminating directing coherent light through the scattering medium the object in the scattering medium;
   a sensor for receiving light that passes through scattering medium; and
   a computing device coupled to the sensor and receiving a plurality of elemental images of the object from the sensor;
   wherein the computing device causes the elemental images to be magnified through a virtual pin-hole array to create a pattern of overlapping magnified elemental images and wherein the computing device averages overlapping portions of the element magnified images to form an integrated image.

2. The system of claim 1, wherein the sensor includes a plurality of separate sensors.

3. The system of claim 1, the sensor is movable and the plurality of element images are formed by moving the sensor relative to the objects.

4. The system of claim 1, wherein the each element image is magnified at a first reconstruction distance and a first portion of the integrated image is formed at the first reconstruction distance.

5. The system of claim 4, wherein the each element image is magnified at a second reconstruction distance and a second portion of the integrated image is formed at the second reconstruction distance.

6. A method of visualizing an object in a scattering medium, the method comprising:
   directing coherent light through the scattering medium;
   receiving from an imaging system a plurality of elemental images of the object from different locations formed based on coherent light that passed through the scattering medium;
   forming magnified elemental images from the elemental images;
   overlapping the magnified elemental images on a reconstruction image plane; and
   forming an integrated image of the object based on the overlapping magnified elemental images by solving for a 3D image reconstruction expression (I) based on a sum of magnified elemental images divided by a number of overlapping pixels in the magnified images.

7. The method of claim 6, wherein forming an integrated image includes averaging overlapping portions of the magnified elemental images.

8. The method of claim 6, wherein forming an integrated image includes solving for I in the expression:

$$I(x, y, z_0) = \frac{1}{N_s} \sum_{i=0}^{N_i-1} \sum_{j=0}^{N_j-1} M_{E_{ij}}\left(x + \frac{z_0 p_x}{f} i, y + \frac{z_0 p_y}{f} j\right).$$

9. The method of claim 6, wherein overlapping includes overlapping the magnified elemental images on a first reconstruction plane at a first distance and forming an integrated image of the object includes forming a first portion of the integrated imaged based on the overlapping magnified elemental images at the first distance.

10. The method of claim 9, wherein overlapping includes overlapping the magnified elemental images on a second reconstruction plane at a second distance and forming an integrated image of the object includes forming a second portion of the integrated imaged based on the overlapping magnified elemental images at the second distance.

11. The method of claim 6, wherein the scattering medium comprises one or more of: clouds, fresh water, ocean water, fog, haze, rain, snow, or smoke.

12. The method of claim 6, wherein the scattering medium comprises one or more of skin, biological tissue or another fluid-containing sample of biological interest.

* * * * *